(12) United States Patent
Brammer

(10) Patent No.: US 6,498,291 B2
(45) Date of Patent: Dec. 24, 2002

(54) STATIC ELECTRICITY ELIMINATOR

(76) Inventor: James William Brammer, 2338 Catawba Rd., Roanoke, VA (US) 24175

( * ) Notice: Subject to any disclaimer, the term of this patent is extended or adjusted under 35 U.S.C. 154(b) by 0 days.

(21) Appl. No.: 10/050,698

(22) Filed: Jan. 18, 2002

(65) Prior Publication Data

US 2002/0070039 A1 Jun. 13, 2002

Related U.S. Application Data

(63) Continuation-in-part of application No. 09/274,355, filed on Mar. 11, 1999, now abandoned.

(51) Int. Cl.$^7$ ................................. H02G 13/00
(52) U.S. Cl. .................. 174/3; 174/5 SG; 174/6
(58) Field of Search ............. 174/1, 2, 3, 5 R, 174/5 SG, 6, 7; 52/723.1, 723.2, 724.5, 729.5

(56) References Cited

U.S. PATENT DOCUMENTS

| | | |
|---|---|---|
| 110,778 A | 1/1871 | Munson |
| 160,151 A | 2/1875 | Bryan |
| 362,062 A | 5/1887 | Cole |
| 433,459 A | 8/1890 | Ferrell |
| 505,106 A | 9/1893 | Hodges |
| 708,188 A | 9/1902 | Wilson |
| 796,760 A | 8/1905 | McCullough |
| 873,154 A | 12/1907 | Miller |
| 1,904,773 A | 4/1933 | Aanenson |
| 2,111,799 A | 3/1938 | Newpher |
| 4,180,698 A | 12/1979 | Carpenter |
| 4,540,845 A | 9/1985 | Frola |
| 4,565,900 A * | 1/1986 | Arnau ........................ 174/3 |
| 4,926,284 A | 5/1990 | Guegenio |
| 4,994,629 A | 2/1991 | Tatum et al. |
| 5,073,678 A | 12/1991 | Carpenter, Jr. |
| 5,335,160 A * | 8/1994 | Savoca ..................... 174/45 R |
| 5,657,197 A | 8/1997 | Skinner, II et al. |
| 5,998,731 A | 12/1999 | Takamura |
| 6,121,543 A | 9/2000 | Hallmark |

* cited by examiner

Primary Examiner—Chau N. Nguyen
Assistant Examiner—Adolfo Nino
(74) Attorney, Agent, or Firm—Rodney A. Corl

(57) ABSTRACT

When static electricity builds up in the earth, it is suddenly discharged in a destructive bolt of electricity which can cause fires, property damage and loss of life. The present invention collects this static electricity from the earth before it can build up, and dissipates it to the atmosphere gradually so as to prevent fires, property damage and loss of life. A plurality of relatively long underground wires conduct the electricity from the ground to a metal pole which extends from the ground upwardly approximately 40 feet or more, and the pole dissipates the electricity to the atmosphere. In one embodiment, a U-shaped top fixture on the pole increases the dissipation of electricity to the atmosphere.

7 Claims, 2 Drawing Sheets

STATIC ELECTRICITY ELIMINATOR

RELATED APPLICATIONS

This is application is a continuation-in-part of application Ser. No. 09/274,355 filed on Mar. 11, 1999, now abandoned, entitled LIGHTNING RETARDER.

BACKGROUND OF THE INVENTION

The purpose of this invention is to reduce or eliminate lightning strikes, which cause fires. Lightning occurs when there is a buildup of static electricity, which suddenly discharges in the form of a bolt of electricity. If this buildup can be reduced or eliminated then there will be no sudden discharge and no lightening bolt. This will result in a reduction in fires and the resulting damages to property and loss of life.

While there have been "lightning rods" around for many years, the device of the present invention is not a lightning rod and does not work in the same manner as a lightning rod. A lightning rod works by attracting the sudden discharge of electricity in the form of a lightning bolt and dissipating this bolt of electricity thereby preventing the bolt from striking nearby objects. The static eliminator of the present invention works in an almost opposite manner. By constantly dissipating the static electricity to the atmosphere, there is never a buildup of charge, and consequently, no sudden discharge and hence no lightning bolt or associated fires and damage.

BRIEF SUMMARY OF THE INVENTION

The static eliminator of the present invention physically resembles a lightning rod, but due to some subtle differences, acts in a very different manner. The static eliminator consists of a long metal pole affixed in the ground and extending to a substantial height above ground level. Conductive wires are attached to the base of the pole and extend a large distance in several directions from the base of the pole and are buried in the ground. These wires accumulate the static charge from the earth, conducting it to the pole which in turn bleeds the static electricity to the atmosphere

BRIEF DESCRIPTION OF THE DRAWINGS

The invention will be further described in connection with the accompanying drawings, in which.

DETAILED DESCRIPTION

Figure 1:
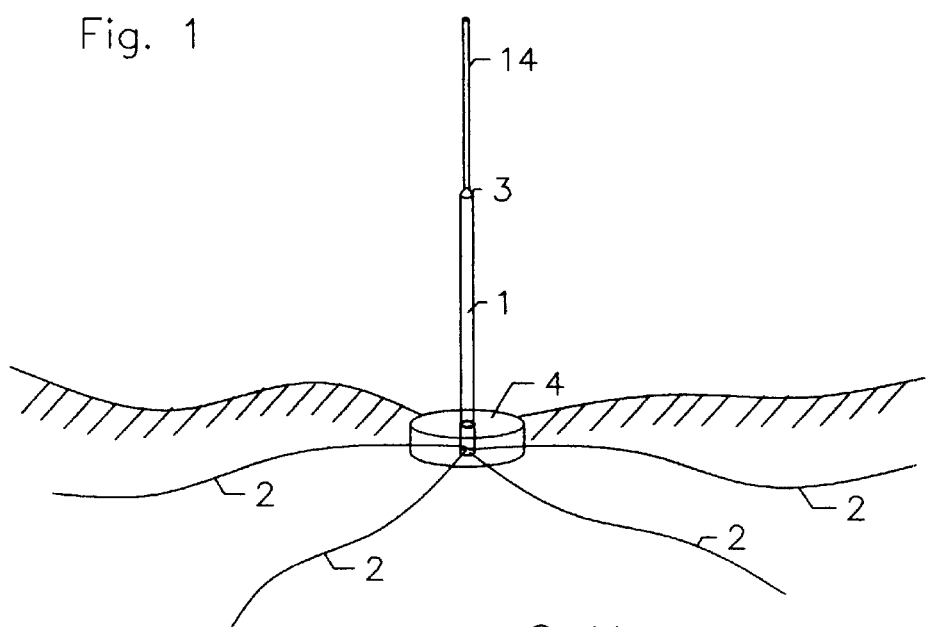
FIG. 1 is a perspective view of one embodiment of the invention.

In one embodiment, shown in FIG. 1, the static eliminator of the present invention consists of a pole 1, preferably made of steel pipe with a 1 ½ inch diameter, extending upwardly from the ground 7 approximately 20 feet. A reducer coupling 13 is connected at the top of the 1 ½ inch pole and another pipe 14 of ½ inch diameter is connected to the coupling and extends further upwardly approximately 20 more feet. The pipe 1 is placed in a hole in the ground approximately 3 feet deep and a concrete collar 4 is poured around the pole 1 to anchor it in the ground. Before pouring the concrete, wires 2 are attached around the base of the pole 1 by any suitable means such as screws or clamps. The wires 2 are preferably made of 12 gauge or larger copper and each extends outwardly from the pole 300 feet or farther. The wires 2 are buried in the ground 7 at a depth of at least 15 inches. It should be noted that pole 1 is not attached to any structure in order for it to function with maximum efficiency. In fact, pole 1 is as far from any surrounding structures as physically practical.

Figure 2:
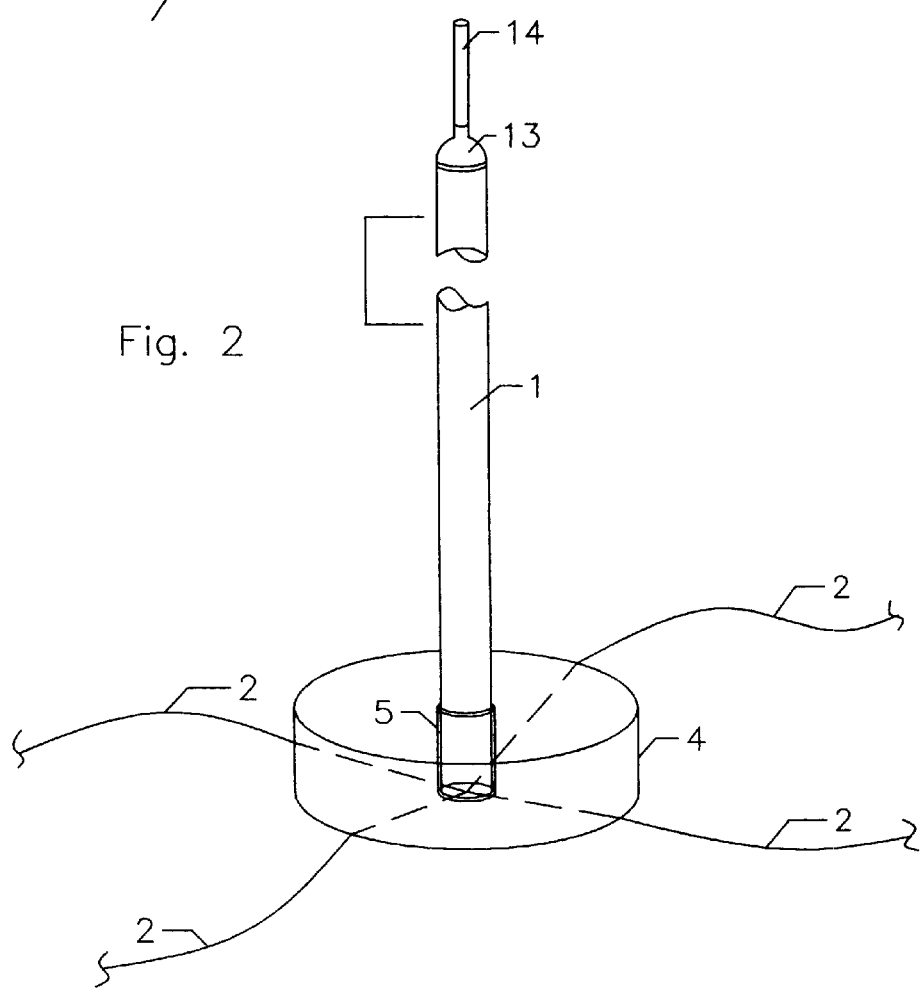
FIG. 2 is a detailed view of the base of the invention.

In FIG. 2, details of the invention can be seen. Pole 1 is surrounded by an insulating sleeve 5 of any electrically insulating material such as glass or plastic. Sleeve 5 extends from the bottom of pole 1 to the top of concrete collar 4 or above ground level, whichever is higher. Wires 2 are attached at the base of the pole 1 and extend outwardly therefrom, through the concrete collar 4. Reducer 13 is attached at the top of pole 1 and pole 14 of reduced diameter extends upwardly therefrom.

Figure 3:
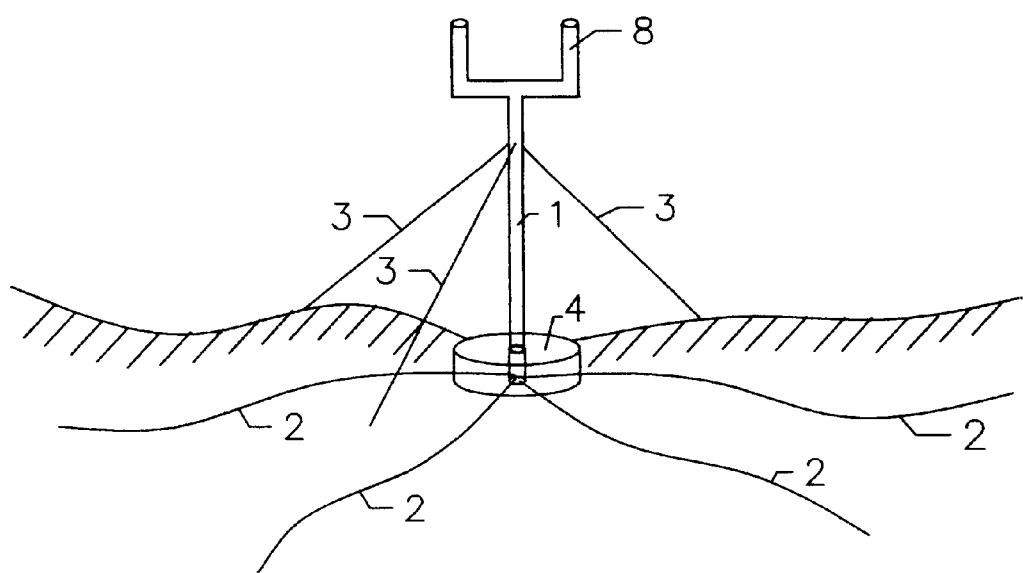
FIG. 3 is a perspective view of another embodiment of the invention.

Another embodiment of the invention is shown in FIG. 3. In this embodiment, pole 1 of 1 ½ inch diameter extends upwardly from the ground to a height of 40 feet or more. Guy wires 3 may be attached to the pole 1 and to the ground 7 to give extra stability. The base of the pole is substantially as shown in FIGS. 1 and 2. The top portion 8 of the pole, shown in detail in FIG. 4, increases the dissipation of static electricity to the atmosphere by having two points of discharge extending into the atmosphere.

Figure 4:
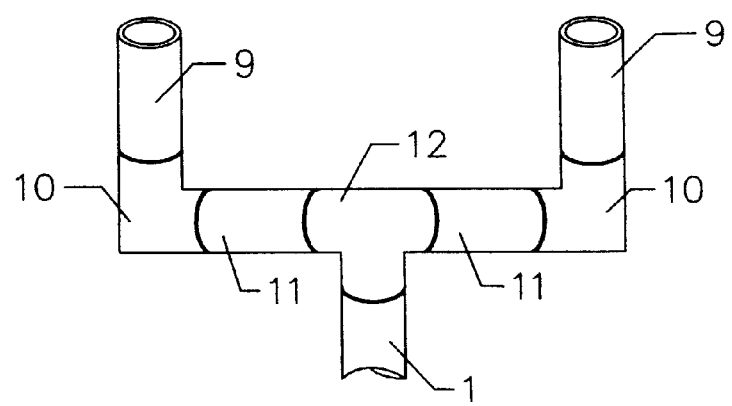
FIG. 4 is a detailed view of the upper end of the pole of this other embodiment.

In FIG. 4, the top portion 8 of the static eliminator of FIG. 3 is shown. This top portion consists of a T coupler 12 attached to the top of pole 1. A connecting portion 11 having a length of about 12 inches is connected to either side of the T 12. An elbow 10 connects the laterally extending connecting portion 11 to an upwardly extending extension 9. The extension 9 extends upwardly approximately 12 inches, and acts to dissipate the electrical charge into the atmosphere.

Although the foregoing description is necessarily of a detailed character in order that the invention be completely set forth, it is to be understood that the specific terminology is not intended to be restrictive or confining, and that the various rearrangements of parts or modification of detail may be resorted to without departing from the scope or spirit of the invention as herein claimed.

I claim:

1. A static electricity eliminator for bleeding static electricity from the ground to the atmosphere comprising a metal pole having a lower end buried in the ground and an upper end extending upwardly into said atmosphere, a plurality of wires attached to said lower end and extending outwardly therefrom, said plurality of wires being buried in said ground, a concrete collar surrounding said lower end in the ground for supporting said pole, and means surrounding said lower end for electrically insulating said pole from said ground.

2. The static electricity eliminator of claim 1 wherein each of said plurality of wires is at least 300 feet long.

3. The static electricity eliminator of claim 1 wherein said metal pole is not connected to any other surrounding structures.

4. The static electricity eliminator of claim 1 wherein said upper end consists of a pipe of a first diameter extending upwardly from said lower end, and a pipe of a second, lesser diameter, extending upwardly from said pipe of said first diameter.

5. The static electricity eliminator of claim 1 wherein said upper end consists of a U-shaped member attached to said metal pole.

6. A device for eliminating static electricity from the ground by gradually bleeding the static electricity to the atmosphere comprising, a metal pole having a lower portion buried at least three feet in the ground and surrounded by a concrete collar, a plurality of copper wires attached to said lower portion and extending outwardly therefrom a distance of at least 300 feet, said plurality of wires being buried beneath the surface of the earth, an upper portion extending upwardly from the ground into the atmosphere of the earth, said upper portion terminating in a U-shaped member, insulation means surrounding said lower portion between said concrete collar and said lower portion for electrically insulating said metal pole from the ground, and guy wires extending from said metal pole to the ground for supporting said upper portion, wherein said static electricity is gathered from the earth by said plurality of wires, is conducted to said metal pole and passes to said U-shaped member and is discharged from said U-shaped member to the atmosphere.

7. The device for eliminating static electricity from the ground of claim 6, wherein the metal pole is not attached to any surrounding structures.

\* \* \* \* \*